March 4, 1930.  T. C. WILLSON  1,749,523
PHOTOGRAPHIC CAMERA
Filed Jan. 11, 1926  3 Sheets-Sheet 1
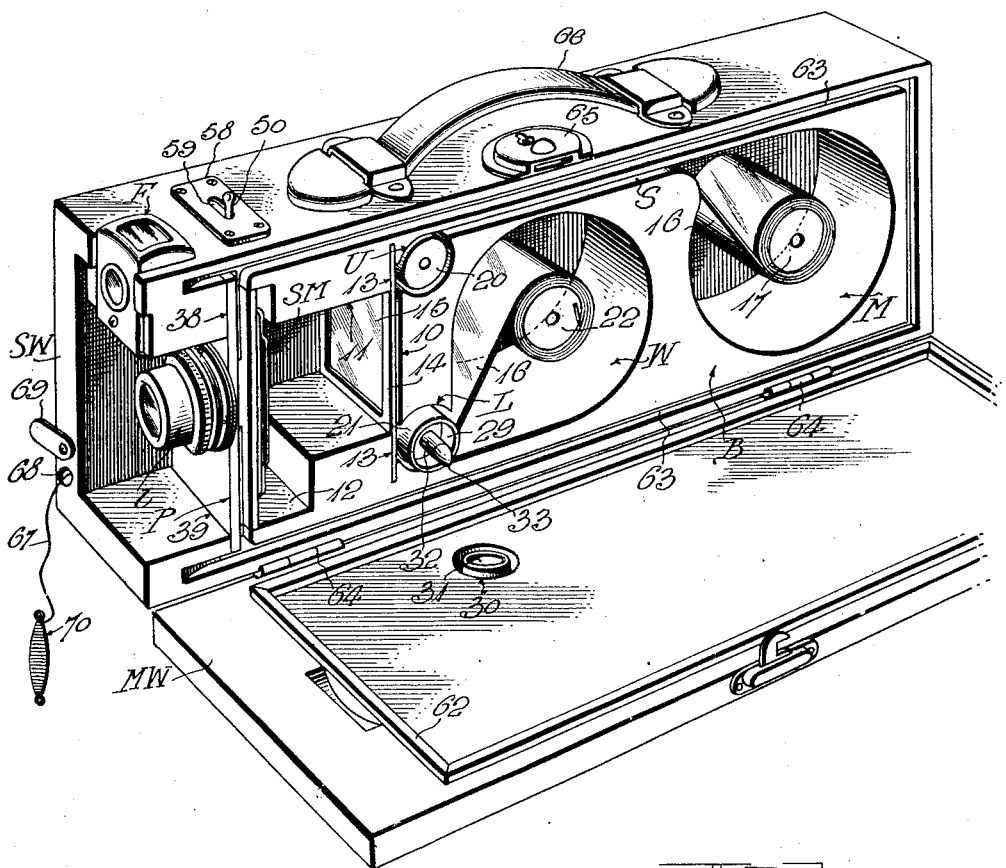
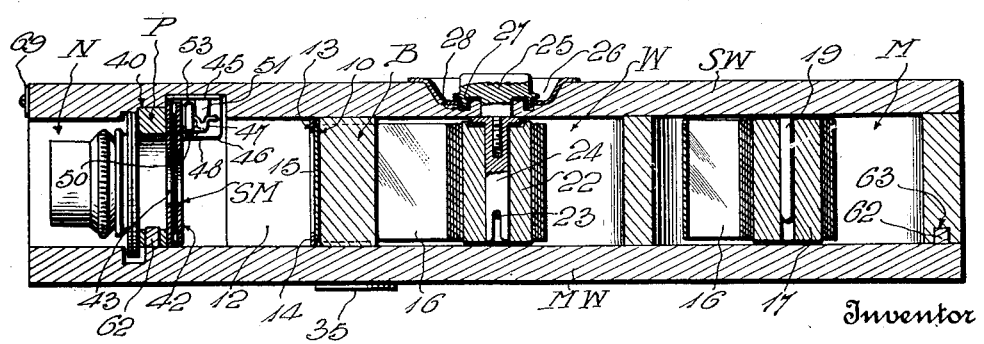
Witness
H. Woodard
Inventor
T. C. Willson
By H. B. Willson & Co.
Attorneys

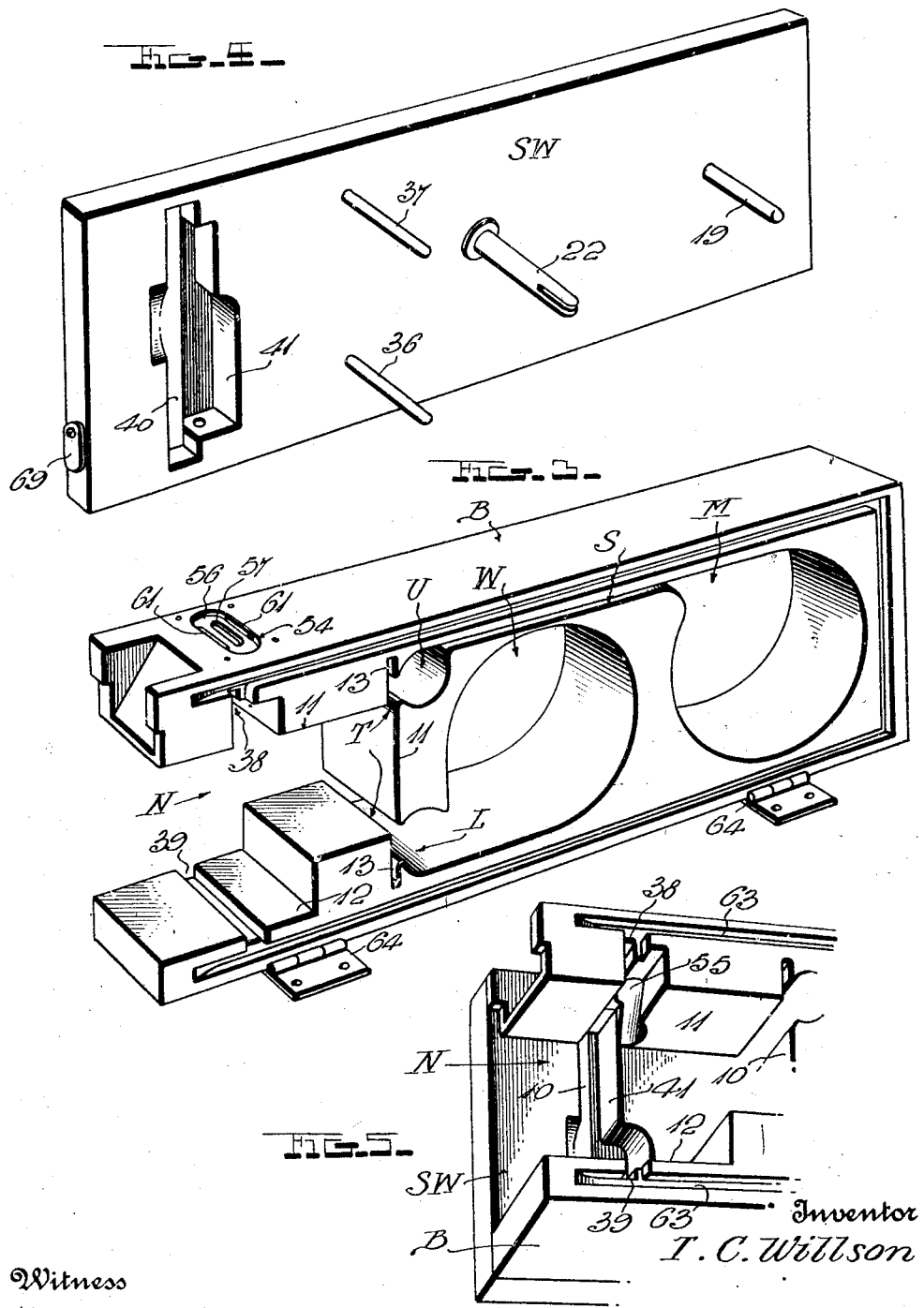

March 4, 1930.  T. C. WILLSON  1,749,523
PHOTOGRAPHIC CAMERA
Filed Jan. 11, 1926  3 Sheets-Sheet 3
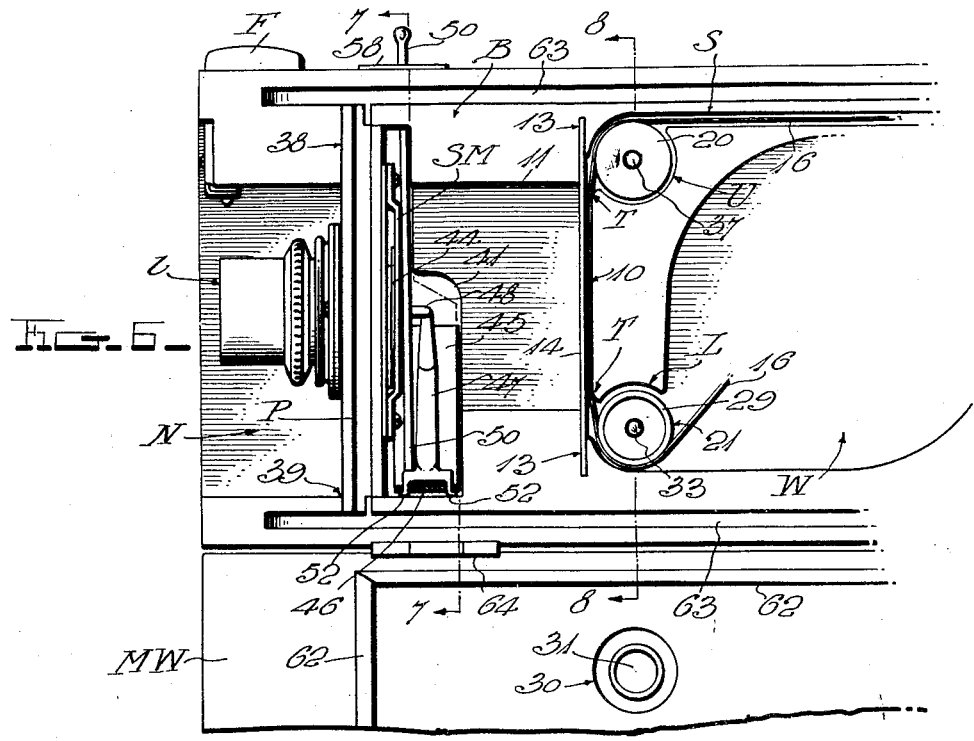
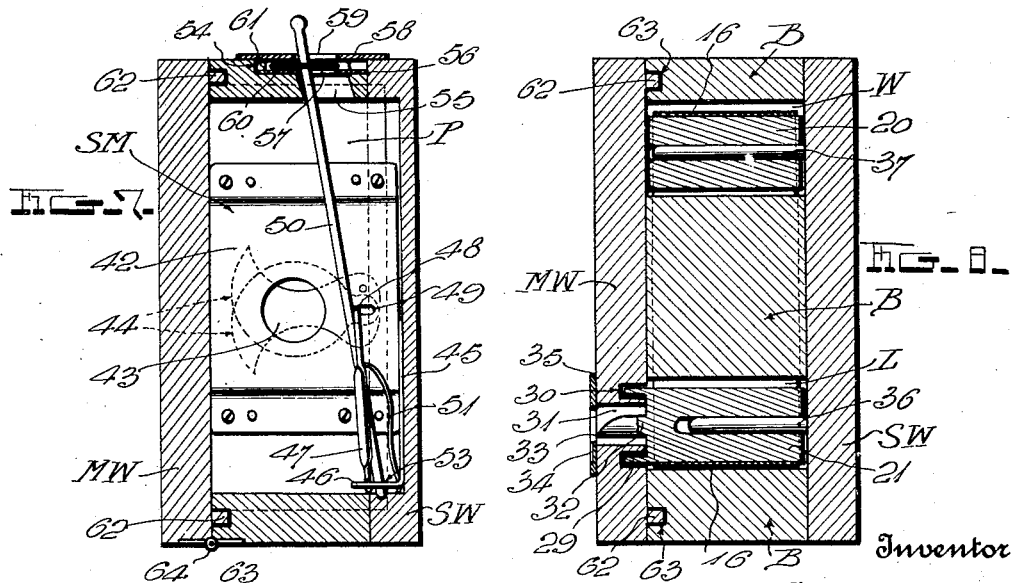
Witness
H. Woodard
Inventor
T. C. Willson
By H. R. Willson &co.
Attorneys Patented Mar. 4, 1930

1,749,523

UNITED STATES PATENT OFFICE

THOMAS CARROLL WILLSON, OF PHILADELPHIA, PENNSYLVANIA

PHOTOGRAPHIC CAMERA

Application filed January 11, 1926. Serial No. 80,531.

The invention is of a type employing a film strip usually of about one hundred feet in length and capable of making approximately five hundred exposures on such strip. Film-strip cameras of this general nature have heretofore been quite extensively used by photographers for rapidly taking photographs of pupils in school rooms, and although there is a tremendous field of operations in this phase of commercial photography, the expenses incident to the same have been heavy and earnings therefore small. In order to diminish the "overhead" and at the same time to extend operations to a great number of rural schools more or less inaccessible to the traveling photographer, I have devised the new and improved camera herein disclosed, which is of such nature that it may be mailed to any school, already loaded and ready for use; may be easily, rapidly and efficiently used by a teacher to "snap" the pupils, and may then be returned, containing the exposed film, for development of the latter and printing.

In devising the invention, one object was to provide a construction which would withstand rough handling and abuse, and would be "fool-proof" to a large extent.

Further objects were to provide unique means for spacing the camera the proper distance from the subject; to provide novel indicating means for use when adjusting the film after each exposure; and to provide simple yet effective shutter mounting and actuating means. While the camera produced for attaining these ends is intended primarily for use such as that above explained, it is by no means restricted to such field. Moreover, certain novel features, it is to be understood, are usable on cameras of types other than that herein disclosed.

With the foregoing in view, the invention resides in the novel subject matter hereinafter described and claimed, the description being supplemented by the accompanying drawings.

Figure 1 is a perspective view of a camera constructed in accordance with my invention, showing the movable side wall of the camera case swung outwardly.

Figure 2 is a horizontal sectional view taken substantially along the plane of the film-winding and magazine spools.

Figure 3 is a perspective view of the block from which the major portion of the camera case is formed.

Figure 4 is a perspective view of the stationary side wall of the case which is secured ot one side of the block shown in Fig. 3.

Figure 5 is a fragmentary perspective view of the front portions of the block and the stationary wall, looking in a different direction from Fig. 3.

Figure 6 is a fragmentary side elevation with the movable wall swung downwardly.

Figures 7 and 8 are transverse sectional views on lines 7—7 and 8—8 of Fig. 6.

The greater part of the camera case is formed from a horizontally elongated block B, of wood or other desired material, said block having a greater transverse dimension vertically than horizontally. Substantially the front third of this block is formed with a lens-and-shutter-receiving-notch N, and at the upper and lower, rear corners of this notch, said block is formed with transverse, horizontal, upper and lower, film-guide-roller-openings U and L, said openings being in communication with the aforesaid corners of the notch N, by throats T. Substantially the intermediate third of the block B, is formed with a winding-spool-opening W, which opening is preferably of substantially ovate form and communicates with the opening L. The rear third of the block B is formed with a magazine-spool-opening M, and the upper portion of said block is provided with a longitudinal slot S which leads from the upper portion of the opening M to the opening U. The notch N, the openings U, L, W and M, the throats T, and the slot S, all preferably open through the opposite vertical sides of the block B and they may all be easily formed with well known wood-working tools. For instance, the notch N, the openings W and M, and the slot S, may well be formed by sawing, while the openings U and L, may be drilled, thus permitting the major part of the camera case to be very easily and inexpensively manufactured.

A vertical partition P extends across the notch N, and carries an appropriate lens 1 and shutter mechanism SM. A finder F is also mounted at the upper side of this notch.

A stationary side wall SW is secured against one vertical side of the block B and engages one edge of the partition P, said wall closing one side of the notch N, openings W and M, one end of the openings U and L and throats T, and one edge of the slot S. A movable wall MW is hinged to close against the opposite vertical side of the block B, and when this wall is swung outwardly, access may readily be had to contained parts, within the camera case.

The notch N is provided with a flat, vertical, rear wall 10, with a top wall 11, and with an angular bottom wall 12. Kerfs 13, are sawed or otherwise formed in the upper and lower walls, near the rear corners of the notch, and the upper and lower ends of a vertical plate 14, are held in said kerfs, this plate being spaced forwardly to a slight extent from the wall 10 to provide a film-guiding space, and being formed with an opening 15, through which light rays may reach the film. This film is designated at 16, being of elongated, strip form, initially wound upon a magazine roller 17 within the opening M, said roller being removably mounted upon a projecting pin 19 which is carried by the stationary side wall SW. From the roller 17, the film 16 passes through the slot S, over an upper guide roller 20 in the opening U, through the uppermost of the throats T, downwardly between the plate 14 and the wall 10, then through the lowermost of the slots T, around a lower guide roller 21 in the opening L, and finally, is wound upon a winding spool 22, in the opening W. This winding spool may have any desired detachable driving connection 23 with a shaft 24 which projects from the stationary wall SW into the opening W, the outer end of this shaft being provided with an appropriate knob 25 which is by preference disposed in a metal-lined depression 26, in the outer side of said stationary wall. Suitable means are of course provided to prevent possible entrance of light under the knob 25, said means being shown in the form of a continuous flange 27 carried by the knob, and a groove 28 receiving said flange. The knob preferably carries an arrow or other indicator, showing the proper direction in which it must be turned to advance the film after each exposure, and novel provision is made for showing when the film has been advanced to the proper extent, for taking the next picture.

The roller 21 is of course turned each time the film 16 is wound upon the spool 22, and it is with this roller, that I associate the indicating means, just referred to. There is also rather unique provision at the end of this roller to prevent entrance of light rays through the opening in which the pointer or indicator operates.

The roller 21 may well be formed of wood, and upon the end of this roller, adjacent the movable wall MW, I form a continuous, projecting flange 29 which is preferably integral with the roller, said flange being receivable in a continuous groove 30, in the inner face of the aforesaid movable wall. This wall is formed with an opening 31, concentric with the groove 30 and extending from the inner to the outer side of said wall, and loosely received in said opening, is an indicating projection 32 which projects axially from the roller 21, within the confines of the flange 29, said projection 32 being preferably of cylindrical form and joined integrally to the roller. The outer end of this projection is formed with an indicating pointer 33, for co-action with an indice 34 at the side of the opening 31, said indice being preferably formed in or on a finishing plate 35 which is secured to the wall MW, around said opening. The pointer 33 is preferably formed by tapering the outer end of the cylindrical projection 32, to an off-center point, so that such point will travel around the wall of the opening 31, as the roller 21 is rotated. This roller is of such size that its circumference corresponds to the distance which the film 16 must be advanced, between exposures. Thus, when the film has been adjusted to the extent at which the pointer 33 has made a complete revolution, the operator knows that the film is properly set for taking the next picture.

The film adjustment indicator and the light-excluding means just described are of exceptionally simple and inexpensive forms, but likewise are of exceptional efficiency, particularly when the tip of the projection 32 is painted white. The flange 29 and the projection 32 may be simultaneously formed by the use of a suitable machine or tool which will cut away the wood previously existing between the portions of the roller 21 to form said projection and flange. Hence, rapidity and ease of manufacture are accomplished. In order that the roller in question may smoothly rotate, a bearing pin 36 is preferably provided for it, as shown in Fig. 4. A similar pin 37 is provided for the upper roller 20, both of said pins projecting from the side wall SW.

The partition P, above referred to, preferably has its upper and lower ends inset in grooves 38 and 39, formed transversely across the top and bottom walls 11 and 12 of the notch N, the inner side of the wall SW being also by preference grooved as at 40, to receive an edge portion of said partition. This wall is also recessed as at 41, to accommodate a portion of the shutter mechanism SM, and the groove 38 is preferably of such width as to receive the upper portion of said mechanism. The mechanism in question, includes a flat vertical sheath 42 preferably formed of two metal plates, suitably secured against the rear side of the partition P and having appropriate openings 43 to permit passage of light rays from the lens 1. Mounted in this sheath, for controlling the passage of light rays, is a shutter which may well consist of two pivotally mounted, crescent-shaped plates 44. One of the plates, of which the sheath 42 is formed is provided at one vertical edge, with a rearwardly directed vertical flange 45, the lower end of this flange extending below the sheath, and being bent laterally inward as at 46. Pivotally mounted upon this inturned flange end, is an upstanding shutter-actuating arm 47 whose upper end may well turn forwardly through a slot 49 in the rear side of the sheath 42, said end 48 being operatively related in any desired manner with the shutter plates 44, so that movement of the arm 47 toward the flange 45, will actuate said shutter plates. A shutter-actuating lever 50 is fulcrumed to the flange end 46 and bears against the end 48 of the arm 47, said lever extending to the exterior of the camera case, so that it may be operated to swing the arm 47 in one direction, movement of said arm in the opposite direction, being effected by an appropriate spring 51.

In pivoting the arm 47 upon the flange end 46, I preferably provide the former with a widened lower end having downwardly projecting fingers 52 (Fig. 6), said fingers passing through openings in said flange end and being bent against the lower side of the latter. To fulcrum the lever 50 to the end 46 of the flange 45, I prefer to merely provide said flange with an opening 53 (Fig. 2), said opening loosely receiving the lower end of said lever.

Unique provision is made to prevent the entrance of light rays, where the lever 50 passes to the exterior of the camera case. The upper side of this case is formed with a recess 54, and an opening 55 leads from the bottom of said recess into the rear portion of the wide groove 38 above described. A plate 56 rests upon the recess bottom and is provided with a slot 57 registering with the opening 55. A finishing plate 58 is secured upon the camera case across the recess 54 and is provided with a slot 59 alined with slot 57. The lever 50 passes through the opening 55 and through both of the slots 57 and 59, and said lever is provided with a plate 60, impervious to light, said plate being disposed in the recess 54, between the plates 56 and 58. This plate is of sufficient size to prevent entrance of light rays through the slots, and while this function is effectively carried out, the three plates are related in such a manner that the movement of the lever is in no manner hampered. To prevent possible upward movement of the plate 56, tending to bind it against the plate 60, said plate 56 is provided with upstanding flanges 61 which abut the top plate 58.

To prevent entrance of any light between the body portion of the camera and the movable wall MW, the latter is provided with a continuous rib 62 receivable in an appropriate groove 63 formed partly within one side of the block B and partly in an edge of the partition P. The wall MW is hinged as indicated at 64, so that it may readily be opened or closed, and I prefer to employ a lock 65 to prevent any unauthorized person from opening the camera and tampering with internal parts, or probably ruining an entire film by exposing it to light. This lock may well be located directly under a carrying handle 66.

Unique provision is made for properly spacing the camera from any subject to be photographed. To accomplish this end, I attach a cord 67 to the front end of the camera case, said cord being of proper length to be used as a measure for obtaining the spacing above referred to. A pocket 68, normally closed by an appropriate cover 69, is provided in the camera case, to normally house said cord, and the end of the latter, remote from the attached end thereof, is provided with a weight 70, which is preferably elongated as shown. This weight forms a core around which the cord is normally wound, so that said core and the wound cord may be effectively confined within the pocket 68. As soon as the cover 69 is opened however and the camera tilted sufficiently, the weight may fall by gravity from the pocket 68, and as it descends, the cord is unwound, so that it is in readiness for immediate use.

Excellent results have been obtained from the exact details herein disclosed. They are therefore preferably followed. However, within the scope of the invention as claimed, various modifications may be made.

Moreover, it is to be understood that such terms as "upper," "lower," "vertical," "horizontal," "top" and "bottom" are relative, rather than limiting, both in the foregoing description and the appended claims.

I claim:—

1. A strip advancement indicator comprising a casing having an opening, a strip-engaging roller within the casing having a central pin at one end received within said opening and tapered to an off-center point at its outer end, said point being confined within the opening, and an indicator at the edge of said opening co-operable with said point.

2. In a film-strip photographic camera having a roller which is turned by the film when moving the same between exposures; an annular flange on one end of said roller concentric with the latter, a wall of said camera being formed with a groove receiving said flange and with an opening from its inner to its outer side concentric with said groove, and an indicating projection on the aforesaid roller end, said projection extending into said opening and having an off-center pointer at its outer end, and an indicator at the edge of said opening co-operable with said pointer to indicate when the film has been properly adjusted for the next exposure.

3. A structure as specified in claim 2; said indicating projection being of cylindrical form and axially disposed on said roller, said pointer being formed by tapering the outer end of said projection to an off-center point.

4. The combination of a body having a compartment open on one side, a hinged cover for said side and formed with an opening surrounded by an annular flange, and a roller journaled in the compartment and having at one end a longitudinally extending, annular flange to telescope the flange on said cover, and an indicating pointer within the longitudinally extending flange and visible through said opening in the cover.

5. The combination of a body having a compartment, one wall of the latter having an opening and an annular groove surrounding said opening to provide an annular flange within the compartment, a strip-engaging roller within the compartment and provided at one end with an annular longitudinally extending flange to telescope the first named flange, said end of the roller also having an indicating pointer surrounded by the flange and visible through said opening in said wall.

6. In a device of the character set forth, a strip position-indicating roller having a cylindrical body formed in one end with a journal-receiving opening and at its other end with an annular, light-excluding flange projecting longitudinally away from the central portion of the roller, and an indicating pointer surrounded by said flange.

7. In a device of the character set forth, a strip-engaging roller having at one end an annular, light-excluding flange projecting longitudinally away from the central portion of the roller, and an outwardly projecting indicating pointer surrounded by said flange.

In testimony whereof I have hereunto affixed my signature.

THOMAS CARROLL WILLSON.